INVENTOR

GUIDO N. GUIDELLI GUIDI

BY

ATTORNEY

Oct. 20, 1970 — G. N. GUIDELLI GUIDI — 3,535,533
PHOTOELECTRIC VISIBILITY MEASURER INCLUDING FIXED AND MOVEABLE DIAPHRAGMS
Filed March 16, 1967 — 2 Sheets-Sheet 2

INVENTOR
GUIDO N. GUIDELLI GUIDI

BY *Otto John Munz*
ATTORNEY

United States Patent Office 3,535,533
Patented Oct. 20, 1970

3,535,533
PHOTOELECTRIC VISIBILITY MEASURER
INCLUDING FIXED AND MOVEABLE
DIAPHRAGMS
Guido N. Guidelli Guidi, Bologna, Italy, assignor to Società Italiana Apparecchi di Precisione, Bologna, Italy
Filed Mar. 16, 1967, Ser. No. 623,602
Claims priority, application Italy, Mar. 17, 1966, 6,067/66
Int. Cl. G01n 21/02, 21/06
U.S. Cl. 250—218
3 Claims

ABSTRACT OF THE DISCLOSURE

An apparatus sending light over an atmospheric path and having photosensitive elements to transduce light intensity before and after the path. The signals resulting from the transducing are compared to obtain measurements of visibility.

FIELD OF THE INVENTION

The present invention relates to an apparatus for determining visibility of the atmosphere. It utilizes the sending of light over an atmospheric path.

DESCRIPTION OF THE PRIOR ART

The determination of the transmitting power of the atmosphere and of visibility through it is a problem which is becoming increasingly important and urgent for highways, airports and other places where it is necessary to establish the ability of a zone of rapid traffic to move safely in relation to timely visual perception of any possible existing obstacles. The responsibility in case of accidents, on the one hand, and the heavy onus resulting from an eventual decision of closing the traffic, on the other hand, make it mandatory that evaluation of visibility be made by means of instruments rather than by human sight. Thereby, easy disputes on the validity of a subjective fact are avoided, and important decisions are made quickly possible by the presence of accurate data.

Apparatus intended specifically for determining the degree of transparency of the atmosphere has been produced; however, the results obtained have always been so scarce and inaccurate that they arouse practically little interest on the part of the interested authorities.

SUMMARY OF THE INVENTION

According to the concept of the present invention, an apparatus is realized which provides the requirements for a perfect valuation of the degree of transparency and visibility through the atmosphere inasmuch as it determines the transmitting power of light in the atmosphere, a factor to which the visibility is obviously linked.

One characteristic of the present invention resides in the fact that the observations or indications of the instrument are a function of the light being emitted by a projector and the light being received by a receiver after the light itself has traversed the atmosphere.

Objects of the invention are to provide an apparatus: capable of producing atmospheric visibility measurements uniquely and unambiguously; capable of yielding standardized measurements of atmospheric visibility: and combining accuracy and uniqueness of measurement with simplicity of construction.

In a basic form of the invention, there are two parts, these being a projector and a receiver. Light is emitted by the projector into an atmospheric path. The light intensity at the projector is transduced to provide a signal functionally related thereto. The receiver is placed at the other end of the atmospheric path. In the receiver is a second transducer to provide a signal functionally related to the light intensity received. The signals at receiver and projector are compared to determine the atmospheric visibility.

In a further development of the invention, a means is provided to assure that only light from the projector reaches the receiver.

In a further deevlopment of the invention, a means is provided to regulate the size of the signal at the receiver. The incoming light from the projector is focused into a conically converging bundle and a diaphragm of fixed aperture is provided movably in the light in the direction of its conical axis. The movement of the diaphragm regulates the amount of light falling on the transducing element of the receiver and the signals at the projector and receiver can thus be balanced. The movement of the diaphragm is used as a measurement of the visibility.

The preference for a movable diaphragm and converging light rather than for a stationary one having an aperture with a variable area is dictated by novel practicality, economy and accuracy. A diaphragm having a variable area may be employed. In general, any means for varying the light falling on the transducer of the receiver may be utilized, such as polarizers being crossed at an angle of variable crossing, screens having variable density, and the like, the function thereof being limited to bringing back the value of the light to that which it would have had if there had not been attenuation due to traversing the atmosphere and measuring this attenuation from the variation necessary to reestablish the equilibrium.

Of course, the forms, the structural details and the means for screening or shielding and determining the variations of the light in the photosensitive element in the receiver of the present invention may vary in accordance with the technical exigencies and those of application, as long as the basic technical concept remains unvaried.

In a modification of the invention, the moving of the means controlling the light falling on the transducer of the receiver and the recording of the movement is done by an automatic means including a small step-step motor control.

The use of a small stepper motor 8 has been described herein only because the advantages which result from its use for the transmission of the information to different localities.

Many other automatic systems for the displacement of the diaphragm $D_2$ are usable, the measurement of the transparency of the atmosphere being based on the measurement of the displacement of the diaphragm $D_2$ itself.

Other objects and many of the attendant advantages of this invention will be readily appreciated as the same becomes better understood by reference to the following detailed description when considered in connection with the accompanying drawings in which like reference numerals designate like parts throughout the figures thereof.

DESCRIPTION OF THE PREFERRED EMBODIMENTS

Figure 1:
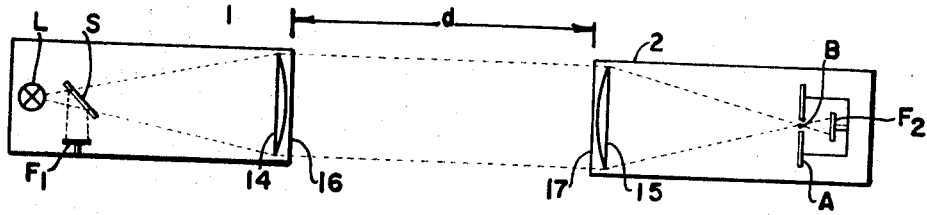
FIG. 1 is a schematic view of the invention.

With reference to FIG. 1 of the accompanying drawing, a lamp L of a projector 1 emits light which is projected in the form of a parallel bundle of light rays with the aid of an optical system 14 toward the receiver 2. The projector optical system may be either a lens or a reflector system, or a combination thereof.

A given portion of the emitted light is deflected by a semireflecting mirror S toward a photosensitive element $F_1$. This element transduces the intensity of the deflected light and gives information concerning the intensity of the original light before the latter traverses the atmosphere. The semireflecting mirror always deflects a given fraction of the light and the intensity reading on $F_1$ is therefore proportional to the intensity of the projected light beam.

The receiver 2 also has an opical system 15 which focuses at B the light beam being received. A wall A is located in the focal plane. It has an aperture B located centrally in said light beam. The wall guarantees that light which travels beyond the aperture is that coming from the projector since any other source not positioned on the same projector axis will produce an image falling on the wall A.

$F_2$ is a second photosensitive element. It measures the intensity of light received.

Figure 2:
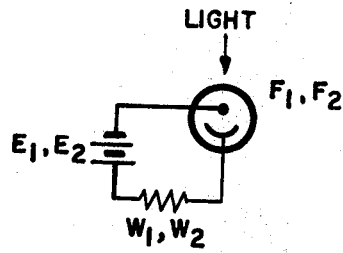
FIG. 2 is a circuit diagram for use with FIG. 1.

The photosensitive elements $F_1$ and $F_2$, shown schematically in FIG. 1, each are in an electrical circuit of the type shown in FIG. 2. The elements $F_1$ and $F_2$ are operated in a range yielding, for example, a linear functional relationship between voltage across $W_1$ and $W_2$ and intensity of impinging light on the elements. $F_1$ and $F_2$ are equal, as are $W_1$ and $W_2$.

The ratio of the intensity of light leaving the projector at plane 16 to the intensity of light entering the receiver at plane 17, $I_R/I_P$, is a measure of the transmitting power of the atmosphere over the path $d$ of FIG. 1.

This ratio is calculated according to the following equation:

$$\frac{I_R}{I_P} = C \frac{V_{W_2}}{V_{W_1}}$$

where C is a constant, $V_{W_2}$ is the voltage across resistance $W_2$ and $V_{W_1}$ is the voltage across resistance $W_1$. The constant C can be determined by placing the projector against the receiver, thereby making $$\frac{I_R}{I_P} = 1$$

and $d=0$, or by calculation. Calculation of C is based on the following proportions:

(a) The intensity of light impinging on $F_2$, is proportional to $V_{W_1}$, and to $I_P$;
(b) The intensity of light impinging on $F_2$ is proportional to $V_{W_2}$ and $I_R$.

The voltages $V_{W_1}$ and $V_{W_2}$ can be measured by a conventional voltmeter.

Figure 3:
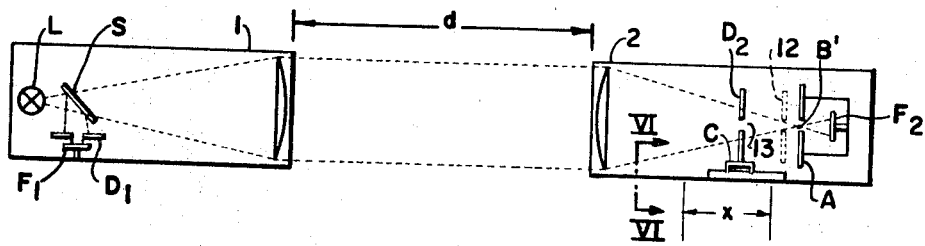
FIG. 3 is a schematic view of a modification of FIG. 1.

In the modification of FIG. 3, the photosensitive elements, $F_1$ and $F_2$, are diaphragmed by $D_1$ and $D_2$ respectively. Let it be assumed that both elements receive only ⅕ of the light which would reach them without diaphragm. Let it be assumed further that, in a clear atmosphere, the measurement in $F_1$ is equal to that in $F_2$. If the transparency of the atmosphere decreases, the measurement in $F_2$ is lowered below the measurement in $F_1$; the problem arises of how to evaluate this difference. In order to obtain this, it was experimentally found sufficient to open the diaphragm $D_2$ that amount necessary to bring the measurement in $F_2$ into balance with that in $F_1$. In view of this, it is thus sufficient to execute a geometrical measurement of the variation of the opening of the diaphragm to refer easily to the loss of intensity the beam has undergone.

The aperture varitaion may be brought about in many different ways, for example according to all those modes which are used in the photographic optical systems. In the case illustrated here, however, a very precise system of great reproducibility and simplicity of execution is employed.

The diaphragm $D_2$ has a nonadjustable calibrated aperture and the entire diaphragm has been mounted on a movable carriage or support C which is adapted to slide parallelly to the optical axis of the light cone which has its vertex in the focus at B.

When the diaphragm is moved toward the vertex of the cone, an ever increasing percentage of the light beam can pass through the calibrated opening of the diaphragm $D_2$, until—at the location 12 shown in dashed lines in FIG. 2—in proximity to the vertex of the cone, all the light collected by the lens travels through the diaphragm, since the cross section of the light cone at this point is equal to the aperture opening of the diaphragm $D_2$. Along the course of the carriage travel, a certain amount of light admitted will have a functional relationship to every position. In the presence of a murky atmosphere, there will correspond to each value of light loss a position of the diaphragm which compensates it.

The limits of the measurement extend from a perfect transparency, 100% transmission, to the limit chosen when the two cells are diaphragmed. In the example presented, a diaphragming to ⅕, one would thus come to measure a transmission up to ⅕, that is to say, to 20% of the emitted light. The extension of the measurement therefore depends upon the initial diaphragming which will be chosen in accordance with the field of measurement that is of interest.

From these values—taking into account the distance between projector and receiver, and thus the length of the air sample being examined—one concludes regarding the values of visibility. By way of clarification, it may be specified that with a distance of 50 meters between projector and receiver, a transmission of 20% corresponds to visibility of about 70 meters, in other words, very intense fog.

Figure 4:
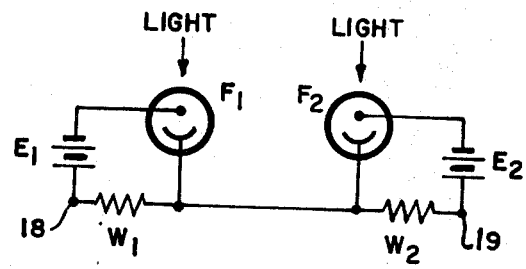
FIG. 4 is a circuit diagram for use with FIG. 3.

Photosensive elements $F_1$ and $F_2$, shown schematically in FIG. 3, are presented in their circuit diagram in FIG. 4. To obtain a measure of the visibility of the atmosphere, the device is first calibrated by placing the projector against the receiver, thereby making the atmospheric distance $d$ equal to zero. While in this position, the diaphragm $D_2$ is moved to position 20, which is determined by noting when the voltage difference between the drops across $W_1$ and $W_2$, thus the voltage between points 18 and 19 of FIG. 4, becomes zero.

After marking position 20, the projector and receiver are mounted a distance $d$ apart. If the atmosphere over the distance is not completely clear, it is necessary to move the diaphragm $D_2$ toward $F_2$, in order that the voltage between points 18 and 19 of FIG. 4 again become zero. The distance of movement, $x$ as shown in FIG. 3, is a measure of the visibility of the atmosphere.

Figure 5:
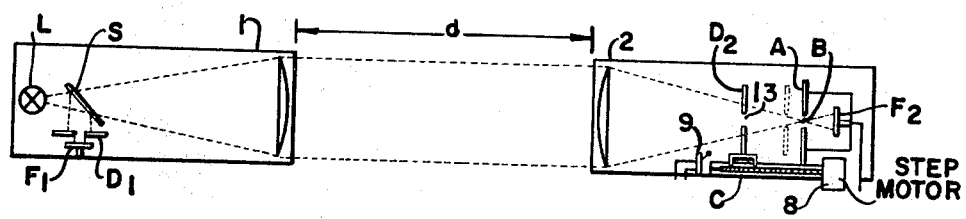
FIG. 5 is a schematic view of a modifictaion of FIG. 3.
Figure 6:
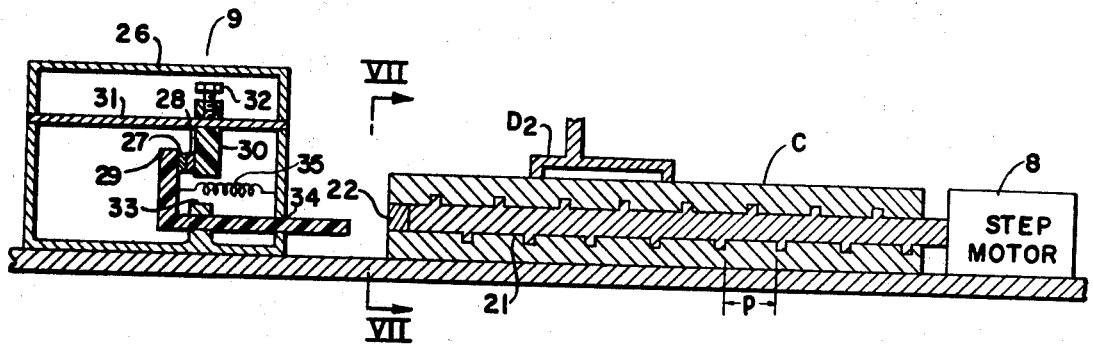
FIG. 6 is a sectional view in the plane of FIG. 5.
Figure 7:
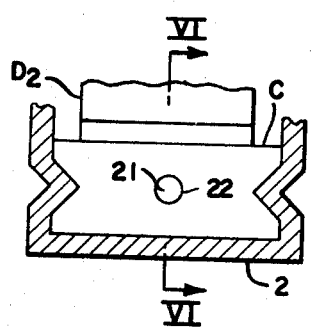
FIG. 7 is an end view of the carriage of FIG. 6 in the direction indicated by line VII—VII.

In another modification of the invention shown schematically in FIG. 5, the movement of diaphragm $D_2$ is controlled automatically. The moving mechanism of the diaphragm carriage C is shown in FIGS. 6 and 7. It comprises a screw 21 in a carriage bore 22. The screw is shown as the shaft of a schematically shown step-step motor 8. If the angular step of the motor is $y$ degrees and the pitch of the screw is $p$, the movement of the diaphragm, $\Delta x$, for one step is $py/360°$.

Also shown in FIG. 6 is a switch means 9 to break a circuit when the diaphragm carriage is a predetermined distance from the focal plane at A. This switch is shown schematically in FIGS. 5 and 8. It comprises electrical contacts 27 and 28 mounted on nonconducting carriers 29 and 30 respectively. Rod 31, which is fixedly mounted to the housing, supports carrier 30, which is adjustably attached thereto by means of a friction-locking bolt 32. Carrier 29 is slidably mounted in the housing at contact points 33 and 34. The electrical contacts are ordinarily held closed by spring 35, but are opened by the pressure of carriage C on carrier 29, when the diaphragm has reached a predetermined distance from the plane at A.

The stepper motor 8 is actuated by pulses from a conventional pulse generator 4 in a manner known in the art. A usable system is disclosed in U.S. Pat. No. 3,024,399, issued Mar. 6, 1962 to J. G. Valentino for a "Pulse-Actuated Motor Driving System."

As is possible in such systems, Valentino shows two connections for introducing the pulses of a pulse generator, these connections providing stepping of the motor in either rotational direction.

Figure 8:
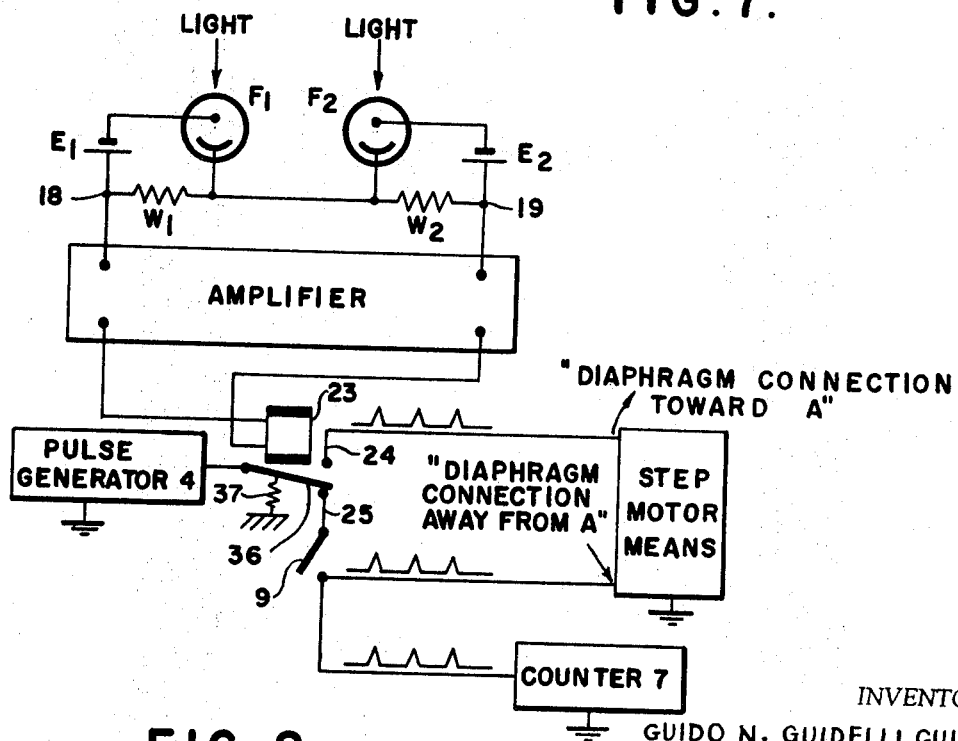
FIG. 8 is a circuit diagram for use with FIG. 5.

The circuit diagram for FIG. 5 is given in schematic detail in FIG. 8. The photosensitive element circuit is exactly that of FIG. 4. The amplifier is connected to amplify the voltage difference at points 18 and 19. The output of the amplifier is fed through the electromagnet of the relay 23. This relay can direct the output of the pulse generator 4 into one of two lines, 24 and 25. Line 24 is connected to that one of the two stepper motor system connections which causes motor shaft rotation such as to move the diaphragm $D_2$ toward $F_2$ in FIG. 5. Line 25 is connected to that other connection of the system causing movement of the diaphragm away from $F_2$ in FIG. 5. Line 25 is also connected to a conventional counter, which counts the number of pulses passing into line 25.

OPERATION OF THE AUTOMATIC CONTROL

Calibration of the modified embodiment of FIG. 5 is achieved by turning on the projector light L and placing the projector against the receiver to make the atmospheric distance $d$ equal to zero. Since the photosensitive element $F_1$ is diaphragmed by $D_1$, a certain amount of diaphragming of $F_2$ is necessary, in order that the voltage across 18–19 be zero. Thus, with the atmospheric distance zero, the carriage C is moved until the aperture of the diaphragm $D_2$ allows just enough light to fall on $F_2$, in order that the voltage across points 18 and 19 equals zero. With the diaphragm carriage in this position, the switch 9 is adjusted until its contact is just broken. This completes the calibration.

After calibration, the projector and receiver are mounted at the opposite ends of an atmospheric path $d$. If the atmosphere is to some degree murky and $D_2$ is in the calibrated position, the voltage across points 18 and 19 is different from zero. The automatic control moves $D_2$ toward the plane of A in order to allow more and more of the light in the cone converging toward plane A to fall on $F_2$, until the voltage difference at 18–19 becomes zero. Then, the control moves the diaphragm $D_2$ back into the calibrated position. During this movement back, the distance of movement is measured. This distance of movement provides a measure of the visibility of the atmosphere, the larger the distance, the lower the visibility.

It is understood that the above-outlined calibration corresponds to a theoretically perfect atmospheric visibility. As a practiced matter, even a clear atmosphere is not completely transparent, because of phenomena such as absorption, diffusion and scattering. Thus, the voltage across points 18 and 19 is always different from zero and even for clear atmosphere, there is a small movement of diaphragm D.

To make a measurement, lever 36 of the relay 23 is moved upwards in FIG. 8 against the force of spring 37, until the field of the relay predominates and the lever closes the circuit into line 24. The relay field arises due to the voltage difference across points 18 and 19. With the circuit into line 24 closed, the diaphragm moves toward tthe plane of A until the voltage difference falls to zero, at which time the lever 36 moves back to close the circuit into line 25. Since the carriage C is now away from the calibrated position, switch 9 is closed also. Now, the carriage moves back into the calibrated position. During this movement back, the pulses in line 25 are counted and displayed on counter 7. The number of counts can be used as a measure of the poorness of the visibility.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

I claim:
1. An instrument for measuring the visibility of the atmosphere, including a light transmitting station comprising a projector, sensing means therewithin for indicating the intensity of the projected beam of light; a receiving station located at a given distance from said transmitting station comprising optical means for gathering and focusing the received beam of light onto a stationary diaphragm located at the focal point of said optical means, light sensing means behind said diaphragm for indicating the intensity of the received light beam, a diaphragm of fixed aperture movably arranged with respect to said stationary diaphragm and in the optical axis of said light beam, means for positioning said diaphragm of fixed aperture along said axis, thereby controlling the intensity of the light falling on said sensing means, at a distance from said stationary diaphragm wherein said light receiving intensity bears a predetermined relation to the intensity of the transmitted light, the relative distance between the said two diaphragms representing a measure of the transmittance of light through the atmosphere and thereby being an indication of the visibility.

2. An instrument in accordance with claim 1 including an electronic circuit wherein the voltage outputs of said sensing means are compared and said moving diaphragm is positioned in accordance with the balance point of said output voltages.

3. An instrument in accordance with claim 1 wherein motor means are provided for positioning said movable diaphragm in discrete steps and means for stopping the actuation of said motor means upon balance between the intensities of the transmitted beam and that of the received beam.

References Cited

UNITED STATES PATENTS 2,073,223  3/1937  Rose _____ 350—180
3,409,372  11/1968  Ricken _____ 250—204

ARCHIE R. BORCHELT, Primary Examiner

M. ABRAMSON, Assistant Examiner

U.S. Cl. X.R.

356—201